(12) United States Patent
Balakrishnan et al.

(10) Patent No.: US 11,809,591 B1
(45) Date of Patent: Nov. 7, 2023

(54) COLUMN HIDING MANAGEMENT SYSTEM

(71) Applicant: Snowflake Inc., Bozeman, MT (US)

(72) Inventors: Raja Suresh Krishna Balakrishnan, Fremont, CA (US); Khalid Zaman Bijon, Santa Cruz, CA (US); Subramanian Muralidhar, Mercer Island, WA (US); David Schultz, Piedmont, CA (US); Jian Xu, San Jose, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/172,404

(22) Filed: Feb. 22, 2023

(51) Int. Cl.
*G06F 21/00* (2013.01)
*G06F 21/62* (2013.01)

(52) U.S. Cl.
CPC .. *G06F 21/6227* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 7,890,508 | B2 * | 2/2011 | Gerber | G06F 16/2343 |
| | | | | 715/229 |
| 8,230,322 | B2 * | 7/2012 | Aureglia | G06F 40/18 |
| | | | | 715/217 |
| 8,370,362 | B2 * | 2/2013 | Szabo | G06Q 30/0226 |
| | | | | 707/739 |
| 9,911,001 | B2 * | 3/2018 | Bisaga | G06F 21/6227 |
| 10,108,648 | B2 * | 10/2018 | Rajan | G06F 16/2272 |
| 2014/0032228 | A1 * | 1/2014 | Johri | G06F 21/6227 |
| | | | | 705/1.1 |
| 2019/0384762 | A1 * | 12/2019 | Hill | G06F 16/2272 |
| 2020/0074107 | A1 * | 3/2020 | Barbas | G06F 16/24564 |
| 2021/0109928 | A1 * | 4/2021 | Robichaud | G06F 16/33 |

* cited by examiner

*Primary Examiner* — Maung T Lwin
(74) *Attorney, Agent, or Firm* — Schwegman Lundberg & Woessner, P.A.

(57) ABSTRACT

Systems and methods for managing column hiding are provided. The systems and methods receive, from a client device, a query associated with a table. The systems and methods determine an access restriction associated with the client device. The systems and methods identify a column of the table that is restricted by the access restriction associated with the client device. In response to identifying the column of the table that is restricted by the access restriction associated with the client device, the systems and methods provide a result of the query that excludes data corresponding to the column.

30 Claims, 8 Drawing Sheets

US 11,809,591 B1

COLUMN HIDING MANAGEMENT SYSTEM

TECHNICAL FIELD

Embodiments of the disclosure relate generally to data platforms and databases and, more specifically, to controlling access to columns of tables.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. Various operations performed on a database, such as joins and unions, involve combining query results obtained from different data sources (e.g., different tables, possibly on different databases) into a single query result. The various operations that can be performed on the databases are controlled based on access privileges of requesting entities.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
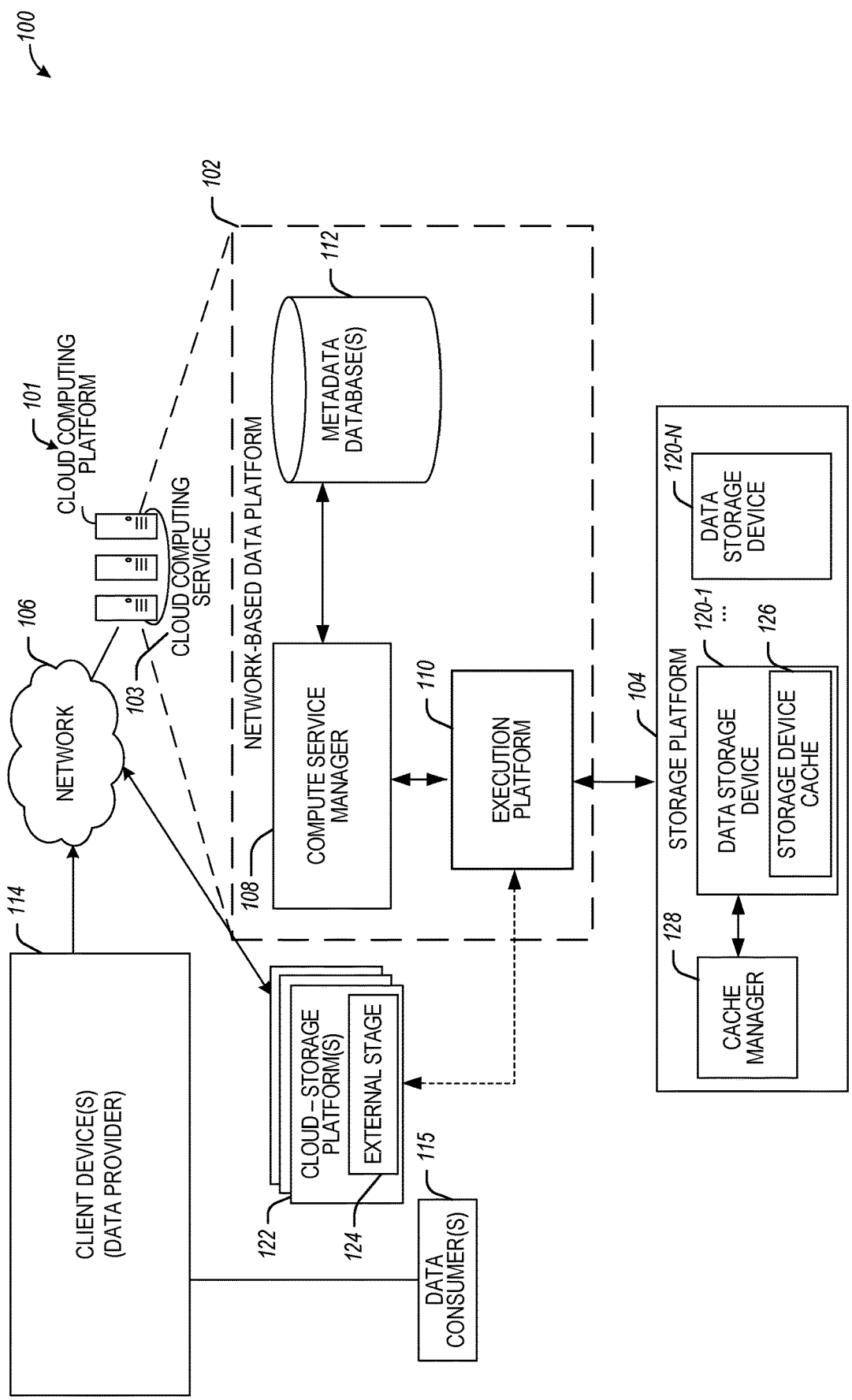
FIG. 1 illustrates an example computing environment that includes a network-based data platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. The data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well. The database can include one or more objects, such as tables, functions, and so forth.

Users and/or executing processes that are associated with a given customer account may, via one or more types of clients, be able to cause data to be ingested into the database, and may also be able to manipulate the data, add additional data, remove data, run queries against the data, generate views of the data, and so forth. In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like.

A given table may be organized as records (e.g., rows or a collection of rows) that each include one or more attributes (e.g., columns). A data platform may physically store database data in multiple storage units, which may be referred to as blocks, micro-partitions, and/or by one or more other names. In an example, a column of a database can be stored in a block and multiple blocks can be grouped into a single file. That is, a database can be organized into a set of files where each file includes a set of blocks. Consistent with this example, for a given column, all blocks are stored contiguously and blocks for different columns are row aligned. Data stored in each block can be compressed to reduce its size. A block storing compressed data may also be referred to as a "compression block" herein. As referred to herein, a "record" is defined as a collection of data (e.g., textual data) in a file that is organized by one or more fields, where each field can include one or more respective data portions (e.g., textual data, such as strings). Each field in the record can correspond to a row or column of data in a table that represents the records in the file. It should be understood that the terms "row" and "column" are used for illustration purposes and these terms are interchangeable. Data arranged in a column of a table can similarly be arranged in a row of the table.

In many cases, the columns of a table contain sensitive information or data that needs to be restricted. Namely, table access control restrictions can be associated with the table to control which users can access which type of data from a table. Conventional systems usually apply such restrictions on a column-by-column basis. Such restrictions usually prevent access to the entries of the column (e.g., rows of the column) but the existence of the column itself including its name remains visible and available to a requesting user. Specifically, a user who is restricted from accessing information associated with a column is still provided with indications of the existence of the column which in and of itself can be sensitive and introduce data privacy concerns.

In addition, the need to manually specify the restriction for each column is tedious and prone to errors. In particular, to implement such restrictions in conventional systems, a separate access control restriction needs to be defined for each column even if such a restriction is the same. This can introduce inefficiencies as restriction data needs to be manually entered, reviewed and corrected for each column. As such, these systems cannot be applied on a large scale to tables with a large number of columns for which access needs to be restricted. The process of manually assigning restrictions to columns is time consuming, inefficient, and prone to human error, which can result in a waste of time, network, and processing device resources.

Aspects of the present disclosure include systems, methods, and devices to address, among other problems, the aforementioned shortcomings of conventional data platforms by intelligently defining column access policies. The disclosed techniques provide access to a table without providing information that discloses the existence of a restricted column of the table. In this way, sensitive information that can be contained in the column including the name of the column itself is preserved, which protects data privacy. In addition, the access policies can be defined as an object that includes the data restriction. The object can then be referenced by any number of columns of the table without having to be redefined and re-expressed each time a new column is identified as needing a restriction. This saves a great deal of time and effort and prevents propagation of errors, which improves the overall efficiency of the system. In addition, when a change to the access restriction is needed, the change is implemented on the object itself that defines the policy. This enables the change to be automatically propagated to each column that is associated or referenced by the object without having to manually modify access restrictions on a column-by-column basis. This improves the overall efficiency of the system.

In this way, the disclosed techniques ensure that sensitive columns in sensitive tables are visible only to designated authorized users and roles. Also, unauthorized users/roles are prevented from being informed about the existence of sensitive columns entirely. Specifically, the disclosed techniques can process a SELECT* query (which can be used to select to view/access all columns of the table) in a way that a result only shows columns of the table that the querying user is authorized to view while hiding columns (preventing access to columns) that the user is not authorized to view. If the query from the unauthorized user specifically mentions a restricted column, the query fails with an error as if the column does not exist in the table. In addition, the disclosed techniques prevent access to and hide metadata associated with the table that references the columns that are associated with the access restriction where the user is not authorized to view such columns.

In particular, the disclosed techniques receive, from a client device, a query associated with a table. The disclosed techniques determine an access restriction associated with the client device. The disclosed techniques identify a column of the table that is restricted by the access restriction associated with the client device. The disclosed techniques, in response to identifying the column of the table that is restricted by the access restriction associated with the client device, provide a result of the query that excludes data corresponding to the column. By performing these operations, the data platform increases utilization of execution node processing capability and avoids waste of resources and inefficient use of resources.

FIG. 1 illustrates an example computing environment 100 that includes a data platform in the example form of a network-based data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based data platform 102 and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., structured query language (SQL) queries, analysis), as well as other processing capabilities (e.g., parallel execution of sub-plans, as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (e.g., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein an internal storage location concerning the data platform. The techniques described in this disclosure pertain to non-volatile storage devices that are used for the internal storage location and/or the external storage location.

From the perspective of the network-based data platform 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location. For example, in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based data platform 102 of the cloud computing platform 101 is in communication with the cloud storage platforms 104 and 122 (e.g., Amazon Web Services (AWS)®, Microsoft Azure Blob Storage®, or Google Cloud Storage). The network-based data platform 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data platform 102.

The network-based data platform 102 comprises a compute service manager 108, an execution platform 110, and one or more metadata databases 112. The network-based data platform 102 hosts and provides data reporting and analysis services to multiple client accounts.

The compute service manager 108 coordinates and manages operations of the network-based data platform 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data platform 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices that may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114 by a data consumer 115. In addition, database operations (joining, aggregating, analysis, inserting, deleting, updating, etc.) ascribed to a user (consumer or provider) shall be understood to include performing such actions by the cloud computing service 103 in response to an instruction from that user, such as using an SQL query or command.

Some database operations performed by the compute service manager 108 can include an operation to hide one or more columns of a table in a result or response to a query received from a client device 114. Specifically, the compute service manager 108 can receive a request to access or perform an operation on a table from the client device 114. The compute service manager 108 can determine or compute access restriction information for a user associated with the client device 114. Based on the access restriction information, the compute service manager 108 can determine whether one or more access restrictions associated with one or more columns of the table are satisfied, which indicates that the user is unauthorized to view/access data from the one or more columns. In response, the compute service manager 108 formulates a response to the query in which the one or more columns of data that are restricted are excluded from being provided in the results. In some cases, the name and any entries included in the one or more columns including metadata referencing such one or more columns are excluded or not returned in the result provided to the client device 114. This ensures that data privacy is preserved and the identity or existence of such restricted access column(s) is not revealed to the user of the client device 114.

For example, the compute service manager 108 can receive, from a client device, a query associated with a table. The compute service manager 108 determines an access restriction associated with the client device. The compute service manager 108 identifies a column of the table that is restricted by the access restriction associated with the client device. The compute service manager 108, in response to identifying the column of the table that is restricted by the access restriction associated with the client device, provides a result of the query that excludes data corresponding to the column.

The compute service manager 108 is also coupled to one or more metadata databases 112 that store metadata about various functions and aspects associated with the network-based data platform 102 and its users. The metadata database 112 can store the table that provides the mapping between sessions, references to objects, identity of objects, and/or access privileges of the objects. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
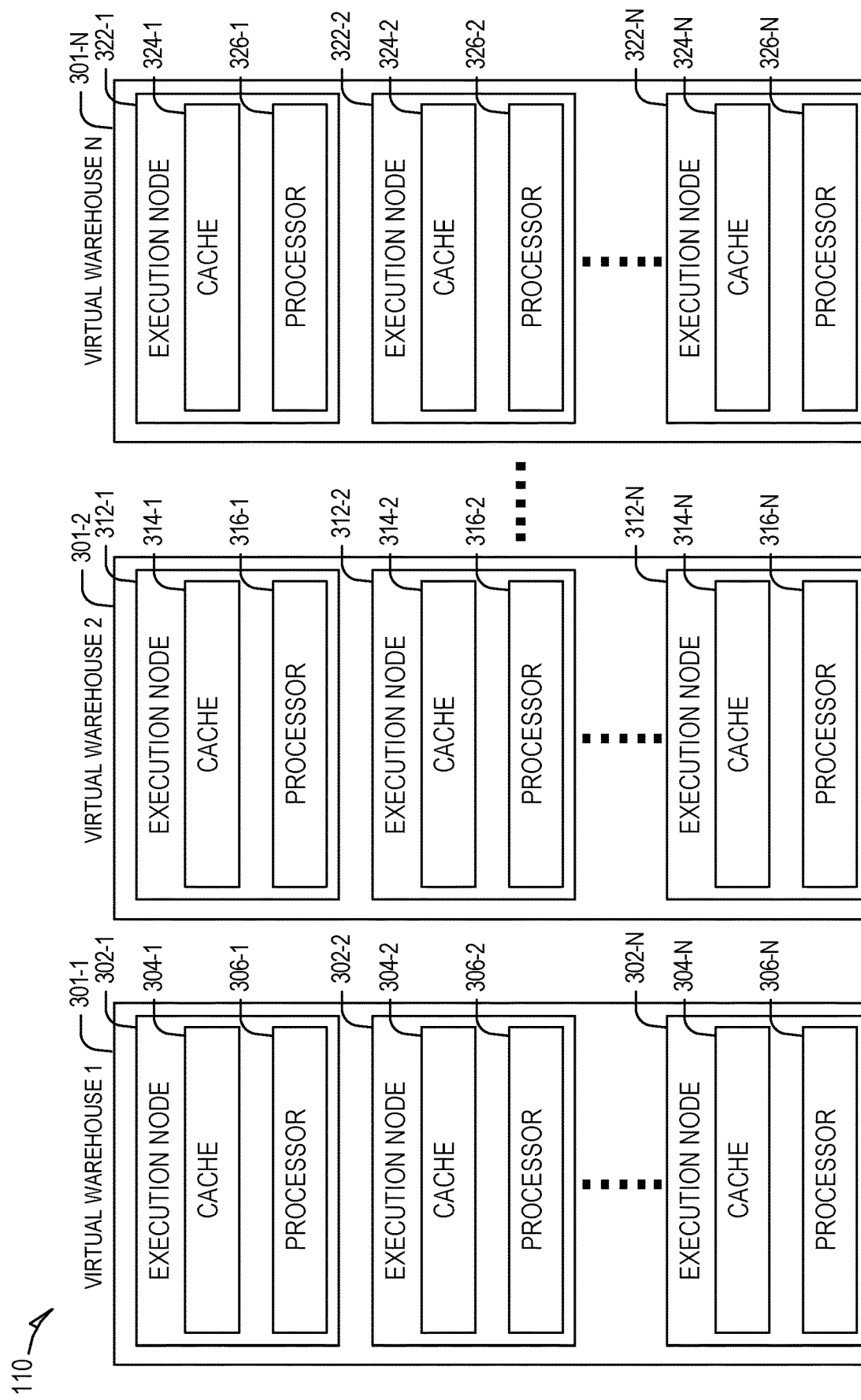
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like.

In some embodiments, at least one storage device cache 126 (e.g., an internal cache) may reside on one or more of the data storage devices 120-1 to 120-N, and at least one external stage 124 may reside on one or more of the cloud storage platforms 122. In some examples, a single storage device cache 126 can be associated with all of the data storage devices 120-1 to 120-N so that the single storage device cache 126 is shared by and can store data associated with any one of the data storage devices 120-1 to 120-N. In some examples, each data storage device of storage devices 120-1 to 120-N can include or implement a separate storage device cache 126. A cache manager 128 handles the transfer of data from the data storage devices 120-1 to 120-N to the storage device cache 126. The cache manager 128 handles the eviction of data from the storage device cache 126 to the respective associated data storage devices 120-1 to 120-N. The storage platform 104 can include one or more hard drives and/or can represent a plurality of hard drives distributed on a plurality of servers in a cloud computing environment.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data platform 102. Thus, in the described embodiments, the network-based data platform 102 is dynamic and supports regular changes to meet the current data processing needs.

During a typical operation, the network-based data platform 102 processes multiple jobs (e.g., operators of sub-plans) determined by the compute service manager 108. These jobs (e.g., caller processes) are scheduled and managed by the compute service manager 108 to determine when and how to execute the job. For example, the compute service manager 108 may divide the job into multiple discrete tasks (e.g., caller processes) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task (e.g., in a storage device cache 126, such as an HDD cache or random access memory (RAM)) and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

According to various embodiments, the execution platform 110 executes a query according to a query plan determined by the compute service manager 108. As part of executing the query, the execution platform performs a table scan in which one or more portions of a database table are scanned to identify data that matches the query. More specifically, the database table can be organized into a set of files where each file comprises a set of blocks (or records) and each block (or record) stores at least a portion of a column (or row) of the database. Each execution node provides multiple threads of execution, and in performing a table scan, multiple threads perform a parallel scan of the set of blocks (or records) of a file, which may be selected from a scan set corresponding to a subset of the set of files into which the database is organized. The query plan, in some cases, can include a request to organize data from a structured or unstructured text file into one or more tables.

The cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
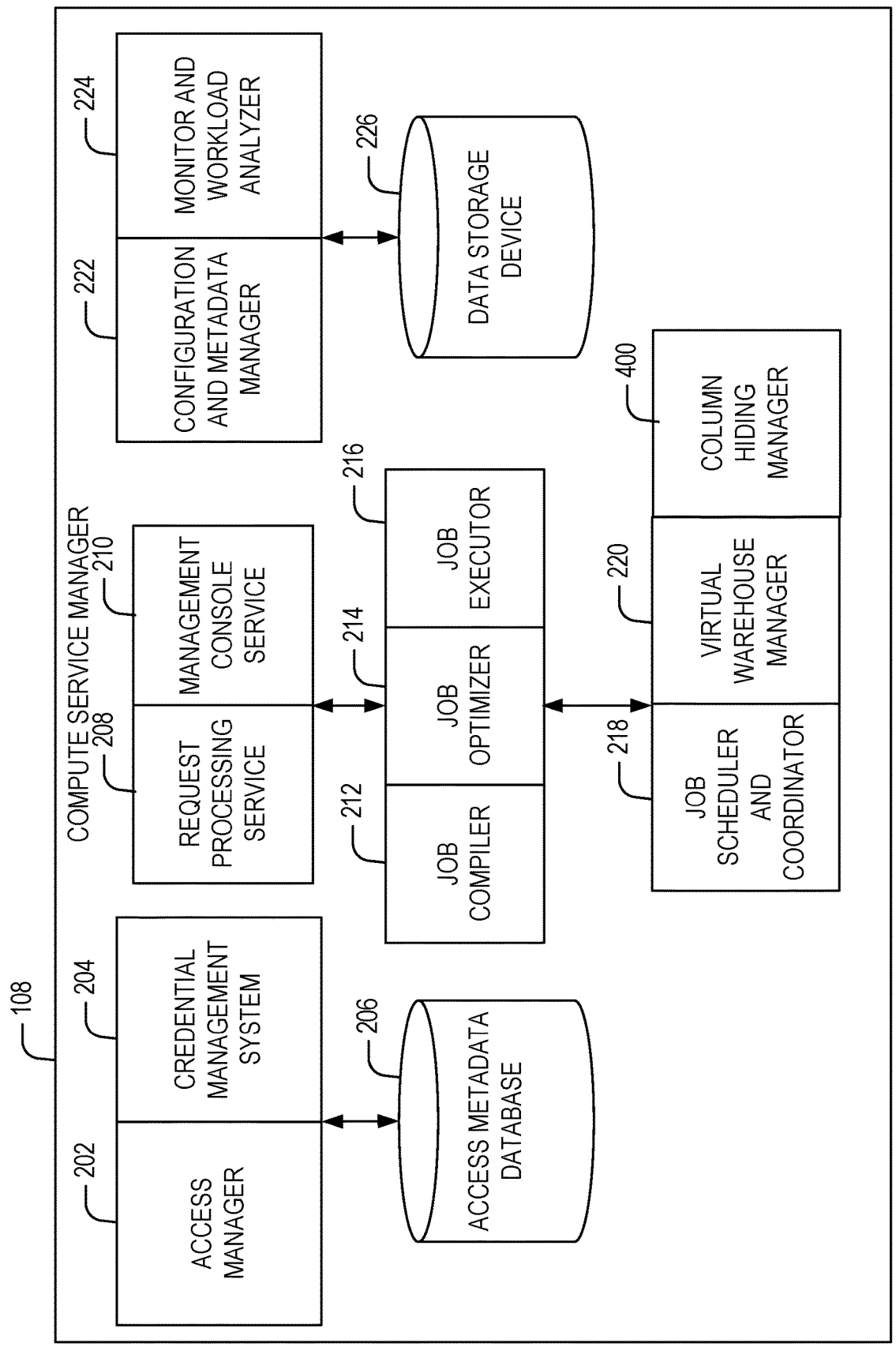
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices," "non-volatile storage devices," "cloud storage devices," or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110, in a storage device cache 126, or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries by one or more execution nodes of the execution platform 110. In some cases, the compute service manager 108 includes a column hiding manager 400, discussed in more detail below, to handle jobs of the job executor 216.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data platform 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based data platform 102. For example, data storage device 226 may represent buffers in execution platform 110, storage devices in storage platform 104, or any other storage device.

FIG. 3 is a block diagram illustrating components of the execution platform 110, which can be implemented by any of the virtual warehouses of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing data from any of the data storage devices 120-1 to 120-N and their associated storage device cache 126 (e.g., via a respective lock file) shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104. The techniques described with respect to the cache manager 128 of the storage platform 104 (e.g., an HDD) can be similarly applied to the cache 304-N, 314-N, and 324-N of the execution nodes 302-N, 312-N, and 322-N.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
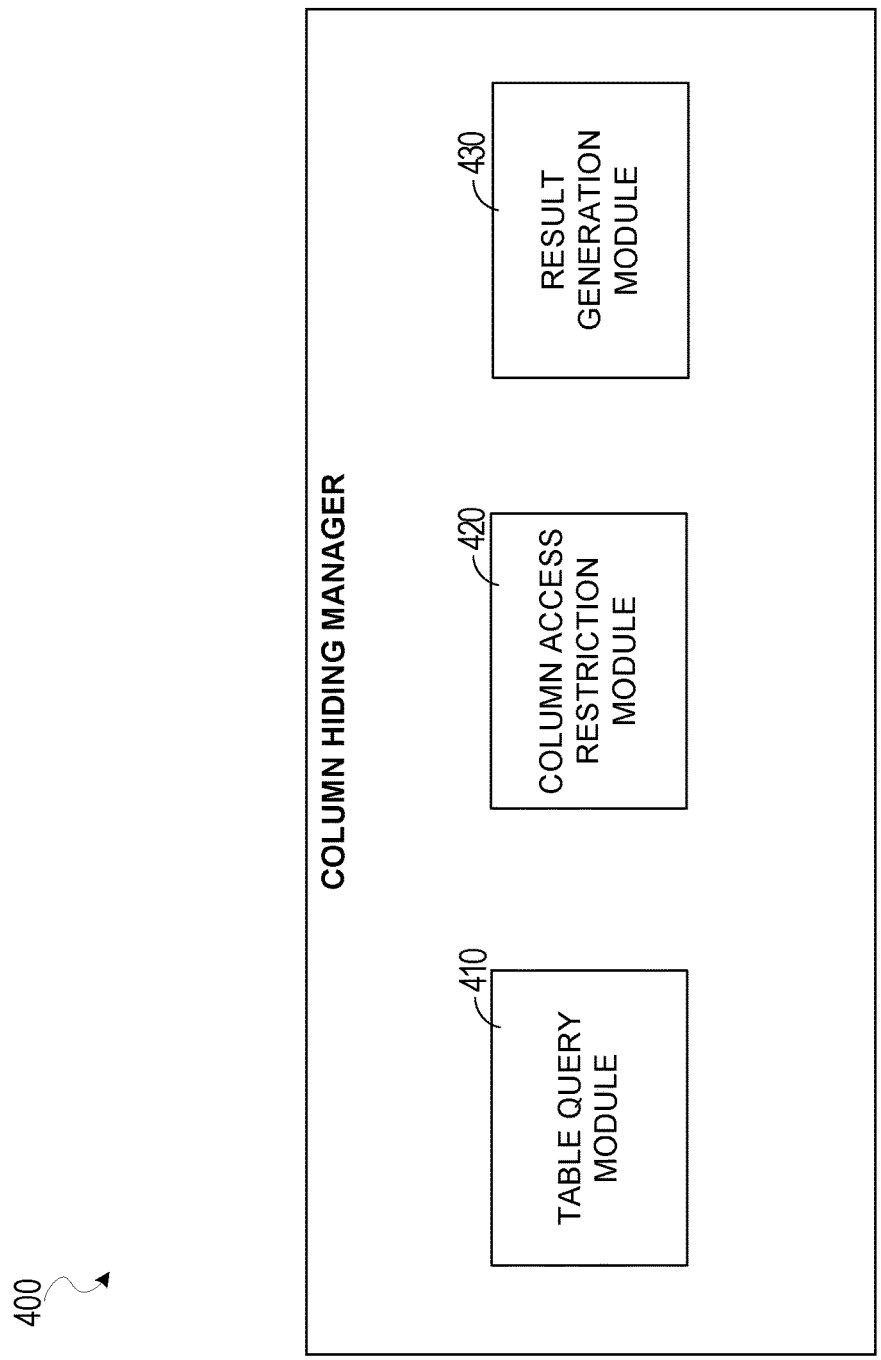
FIG. 4 is a block diagram of a column hiding module, in accordance with some embodiments of the present disclosure.

FIG. 4 is a block diagram illustrating an example of the column hiding manager 400, which can be implemented by any of the virtual warehouses of the execution platform 110, such as the execution node 302-1, compute service manager 108, and/or the request processing service 208, in accordance with some embodiments of the present disclosure. The column hiding manager 400 can include a table query module 410, a column access restriction module 420, and a result generation module 430. The column hiding manager 400 is configured to receive, from a client device 114, a query associated with a table. The column hiding manager 400 determines an access restriction associated with the client device 114. The column hiding manager 400 identifies a column of the table that is restricted by the access restriction associated with the client device 114. The column hiding manager 400, in response to identifying the column of the table that is restricted by the access restriction associated with the client device 114, provides a result of the query that excludes data corresponding to the column.

In some examples, the data excluded from the result includes a name of the column and information stored in the column. In some examples, the column hiding manager 400 generates a materialized view of the table that excludes the column. In some examples, the query includes a select operation associated with all columns of the table, such as a SELECT* operation or request.

In some examples, the query includes a request for information corresponding to the column. In such cases, the column hiding manager 400 provides an error as the result indicating that the requested query failed to execute.

In some examples, the column hiding manager 400 forms a subset of data using a plurality of columns of the table in response to receiving the query. The column hiding manager 400 modifies the subset of the data by removing, from the subset of the data, the column that is restricted by the access restriction associated with the client device 114. The column hiding manager 400 generates the result including the modified subset of the data.

In some examples, the column hiding manager 400 identifies a virtual column that includes one or more references to the column that is restricted by the access restriction associated with the client device. The column hiding manager 400 determines that the query includes a request to access the virtual column. The column hiding manager 400 prevents access to the virtual column for the client device by failing the query in response to determining that the query requests access to the virtual column that includes one or more references to the column that is restricted by the access restriction associated with the client device.

In some examples, the query includes a cloning operation. In such cases, the column hiding manager 400 prevents performance of the cloning operation of the query in response to identifying the column of the table that is restricted by the access restriction associated with the client device. In some examples, the query includes a request access to metadata associated with the table. In such cases, the column hiding manager 400 forms a subset of data representing metadata corresponding to a plurality of columns of the table in response to receiving the query. The column hiding manager 400 modifies the subset of the data by removing, from the subset of the data, metadata corresponding to the column that is restricted by the access restriction associated with the client device. The column hiding manager 400 generates the result including the modified subset of the data.

In some examples, the access restriction is based on one or more criteria including at least one of a role of a user of the client device, an IP address of the client device, a specified time, or range of times. In some examples, the column hiding manager 400 identifies at least one of the role of the user of the client device, the IP address of the client device, or a current time. The column hiding manager 400 determines that the access restriction is satisfied in response to determining that the identified role of the user of the client device, the IP address of the client device, or the current time corresponds to the one or more criteria of the access restriction.

In some examples, the column hiding manager 400 evaluates a policy expression to determine that the access restriction is satisfied. In some examples, the column hiding manager 400 receives, from the client device 114, an insert operation for adding an entry to an individual column of the table. The column hiding manager 400, in response to receiving the insert operation, generates a command including the entry and one or more values for the column of the table that is restricted by the access restriction associated with the client device 114. In some examples, the one or more values include at least one of a null value, a default value, or a value associated with a sequence of the column of the table that is restricted by the access restriction associated with the client device 114.

In some examples, the column hiding manager 400 determines that the column is incapable of storing the one or more values. The column hiding manager 400, in response to determining that the column is incapable of storing the one or more values, prevents execution of the insert operation and returns an error.

In some examples, the column hiding manager 400 receives, from the client device 114, an update or delete operation. The column hiding manager 400 determines that the column of the table that is restricted by the access restriction associated with the client device 114 is specified in the update or delete operation. The column hiding manager 400, in response to determining that the column of the table that is restricted by the access restriction associated with the client device 114 is specified in the update or delete operation, prevents execution of the update or delete operation and returns an error.

In some examples, the column hiding manager 400 generates an object including a policy expression that defines the access restriction. The column hiding manager 400 associates a plurality of columns of the table with the object to restrict access to the plurality of columns using a same policy expression. In some examples, the column hiding manager 400 receives input including an update to the access restriction associated with the object. The column hiding manager 400 automatically applies the update to the access restriction to each of the plurality of columns in response to receiving the input.

For example, the table query module 410 can receive a query from a client device 114. The query can include an instruction to receive a materialized view of all or some of the columns of a table. The query can include a request to view metadata associated with a given table. In some cases, the query can specify an operation to perform on the table, such as a request to insert data to one or more columns, update data in one or more columns, or delete data from one or more columns.

The table query module 410, in response to receiving the query from the client device 114, determines one or more access restriction parameters for the user of the client device 114. For example, the table query module 410 can use an identifier of the user of the client device 114 to obtain a role or level of access associated with the user. In some cases, the table query module 410 can determine the current time at which the query was received as one of the access restriction parameters. The table query module 410 can also obtain an Internet Protocol (IP) address of the client device 114 as one of the access restriction parameters.

The table query module 410 provides the one or more access restriction parameters to the column access restriction module 420. The column access restriction module 420 can obtain a policy expression for the table. The policy expression can define one or more access restrictions that are associated with one or more columns of the table subject to the query. For example, the policy expression can define any combination of a role or access level, a time or range of times, and/or a list of IP addresses that are allowed or restricted (prevented) from accessing or viewing the one or more columns with which the policy expression is associated.

For example, if the role of the user matches the role specified in the policy expression, the column access restriction module 420 can determine that the policy expression is satisfied or met and can restrict access or viewing of the corresponding columns associated with the policy expression. As another example, if the current time associated with the query matches the time or range of times specified in the policy expression, the column access restriction module 420 can determine that the policy expression is satisfied or met and can restrict access or viewing of the corresponding columns associated with the policy expression. As another example, if the IP address of the client device 114 matches the IP address specified in the policy expression, the column access restriction module 420 can determine that the policy expression is satisfied or met and can restrict access or viewing of the corresponding columns associated with the policy expression.

In some examples, an administrator can define the policy expression with the one or more access restriction parameters as a data object. The data object can specify any one or combination of parameters, such as role of a user, time of day, IP address, and so forth. Once the data object is defined, the administrator can select one or more columns of data that are subject to the same set of access restrictions. The administrator can then associate the data object that contains the access restriction with the selected one or more columns. In this way, rather than re-inputting and re-typing in the access restrictions each time for each of the selected one or more columns, the administrator can define the access restriction as an object and then store a reference to the object for each of the selected one or more columns. The access restriction can be defined once and expressed in the form of the data object. The data object can then be referenced by each of the columns to be restricted without having to manually re-define the expression for each column.

In some cases, the administrator can update the access restrictions defined in the object to define a new set of access restrictions. Once the access restrictions are updated in the object, any column that references the object is automatically associated with the new set of access restrictions. In this way, the administrator does not need to re-define or input the new set of access restrictions for each column and can simply input the new set of access restrictions once in the object that defines the policy expression. This prevents the administrator from having to manually search all the columns to find those that have a need for the updated access restrictions which saves a great deal of time and effort and reduces the possibility of errors. Because the columns reference the object which contains the updated new set of access restrictions, the columns are automatically configured to be associated with the new set of access restrictions in response to the administrator updating the access restrictions once in the object that includes the policy expression.

In some examples, the column access restriction module 420 can search the table or database to find columns that match the query received from the client device 114. The column access restriction module 420 forms a set of data including the columns that match the query. The column access restriction module 420 can identify one or more columns in the set of data that include an access restriction that is satisfied by parameters of the user of the client device 114 or the client device 114 itself. The column access restriction module 420 can remove the one or more columns that are identified from the set of data to form a modified set of data. The column access restriction module 420 provides the modified set of data to the result generation module 430. The result generation module 430 then provides the modified set of data to the client device 114 as a response to the query. In this way, at no point is the existence or any information associated with the one or more columns that are restricted for the user of the client device 114 revealed or provided to the client device 114. In some cases, the set of data includes one or more virtual columns that include entries or data that reference data from the one or more columns that are restricted. In such cases, the one or more virtual columns are also removed from the set of data to form the modified set of data.

In some cases, the client device 114 can transmit a query requesting to access the one or more columns that are associated with the policy expression (e.g., are restricted for access by the client device 114). The column access restriction module 420 can receive the query and can instruct the result generation module 430 to return an error to the client device 114 because the columns identified in the query are restricted. The error can simply indicate to the user of the client device 114 that the columns of the query do not exist, which prevents revealing the existence of any information associated with such columns.

In some cases, the client device 114 can transmit a query requesting to perform a given operation on the table (after or before receiving the table in which the one or more restricted columns have been removed or hidden). For example, the query can include a request to insert data or an entry into one of the non-restricted columns of the table. For example, the query can indicate a request to add a new data row to each of the columns of the table with a specified set of values. Namely, if the table includes three columns visible to the client device 114, the client device 114 can transmit a query specifying values for the new entries of the three visible columns. For example, the query can include an expression indicating INSERT (Value 1, Value 2, Value 3) which adds Value 1 to the first column of the table, Value 2 to the second column of the table, and Value 3 to the third column of the table. The table can include a fourth column which is not visible to the client device 114. A proper INSERT expression may need to indicate a value for all the columns including the fourth column.

To properly execute such a query, the query needs to be automatically modified to also include corresponding entries for the restricted column (e.g., the fourth column), which the client device 114 is prevented from accessing or knowing about. In such cases, a query compiler executed by the column access restriction module 420 can automatically populate the values for the restricted columns, which are not expressed in the query. The values can be selected to be any one of a null value, a random value, a value in a sequence, a default value, or any other value. For example, the modified expression can be INSERT (Value 1, Value 2, Value 3, New Value) which adds Value 1 to the first column of the table, Value 2 to the second column of the table, Value 3 to the third column of the table, and the New Value to the fourth column of the table, where the New Value is the null value, a random value, a value in a sequence, a default value, or any other value. In some cases, the restricted access column can be prevented from having new data inserted. For example, the restricted access column can be incapable of storing the New Value. In such cases, the column access restriction module 420 can prevent executing the insert operation and can return an error to the client device 114.

In some cases, the query can include an update command for one of the visible columns of the table. In such cases, the column hiding manager 400 updates the specified entry in the identified column in response to the query. The column access restriction module 420 can determine that the update command specifies a restricted access column. In such cases, the column access restriction module 420 prevents executing the command and returns an error indicating that the command is attempting to update a column that does not exist. In some cases, the query can include a delete command for one of the visible columns of the table. In such cases, the column hiding manager 400 deletes the specified entry in the identified column in response to the query. The column access restriction module 420 can determine that the delete command specifies a restricted access column. In such cases, the column access restriction module 420 prevents executing the command and returns an error indicating that the command is attempting to delete an entry from a column that does not exist.

In some cases, the query can specify a cloning operation to duplicate the table. In such cases, the column access restriction module 420 can determine that the table includes one or more columns that are restricted from being accessed by the user or the client device 114. In response, the column access restriction module 420 can prevent executing the command and returns an error indicating that the requested operation to clone the table is not authorized.

Figure 5:
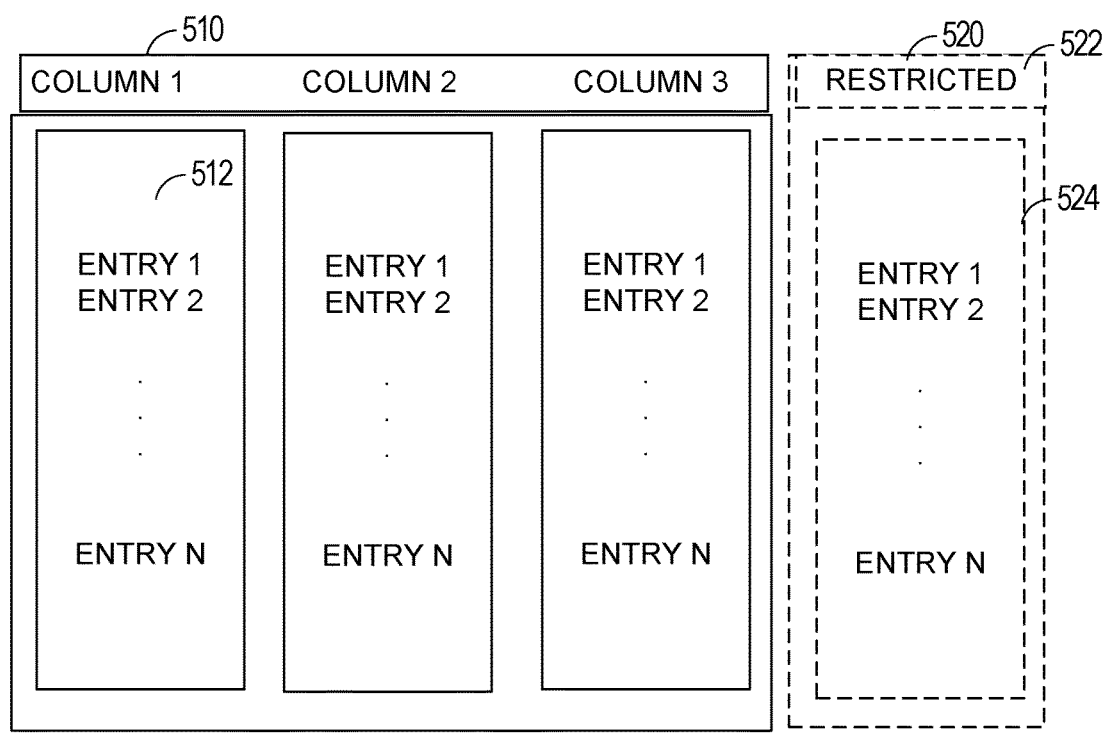
FIGS. 5 and 6 are illustrative outputs of the column hiding module, in accordance with some embodiments of the present disclosure.
Figure 6:
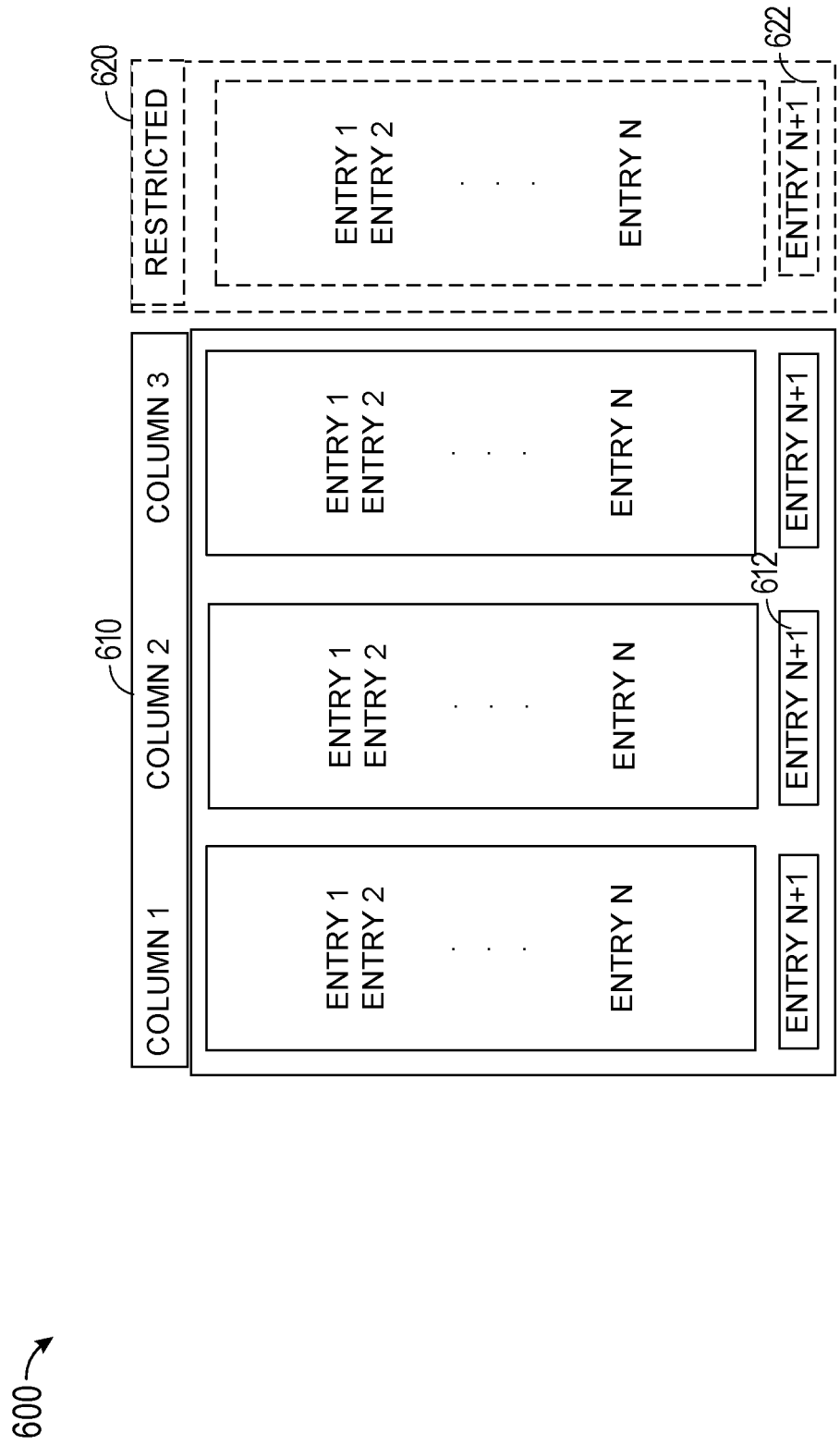

FIGS. 5 and 6 are illustrative outputs 500 and 600 of the column hiding manager 400, in accordance with some embodiments of the present disclosure. For example, the column hiding manager 400 can receive a request from the client device 114 to access a table. In response, the column hiding manager 400 generates a data set in which only the columns of the table that are authorized for access (e.g., for which the access restriction is not satisfied by the client device 114) are visible to the client device 114. Namely, the column hiding manager 400 provides a result including various columns 510 (including column 1, column 2, column 3) and their names and data are visible including their respective entries 512.

The column hiding manager 400 can determine that a fourth column 520 includes an access restriction that is satisfied by parameters of the user of the client device 114 and/or the client device 114 itself. In response, the column hiding manager 400 removes the fourth column 520 from the result provided to the client device 114. The column hiding manager 400 also removes any metadata that references the fourth column 520 and any virtual columns that reference the fourth column 520 from the result provided to the client device 114. In this way, the client device 114 is only presented with a view of the table that includes the various columns 510 and does not include any information that reveals the existence of the fourth column 520, the name 522 of the fourth column 520, or any of the entries 524 of the fourth column 520.

In some examples, the column hiding manager 400 can receive a request or query from the client device 114 to add a new set of entries to the table. For example, as shown in illustrative outputs 600 of FIG. 6, the column hiding manager 400 can add a new set of entries 612 to the visible columns 610. This can be performed in response to an INSERT command that specifies values, such as ENTRY N+1 values, for each of the visible columns 610. The INSERT command does not specify the value for the invisible or restricted access column 620 (corresponding to the fourth column 520). In such cases, to properly perform the INSERT operation, the command compiler automatically populates values for the restricted access column in the INSERT command for any column that is associated with the access restriction preventing the column from being accessed or viewed by the client device 114. Namely, the column hiding manager 400 adds a random value, a default value, a next value in a sequence, a NULL value, or any other suitable value to the INSERT command to add the new entry 622 to the invisible or restricted access column 620. In this way, the client device 114 can perform insert operations to add data to columns of the table including columns that are not revealed and restricted from access by the client device 114 without having to specify the data to add to such restricted access columns of data.

Figure 7:
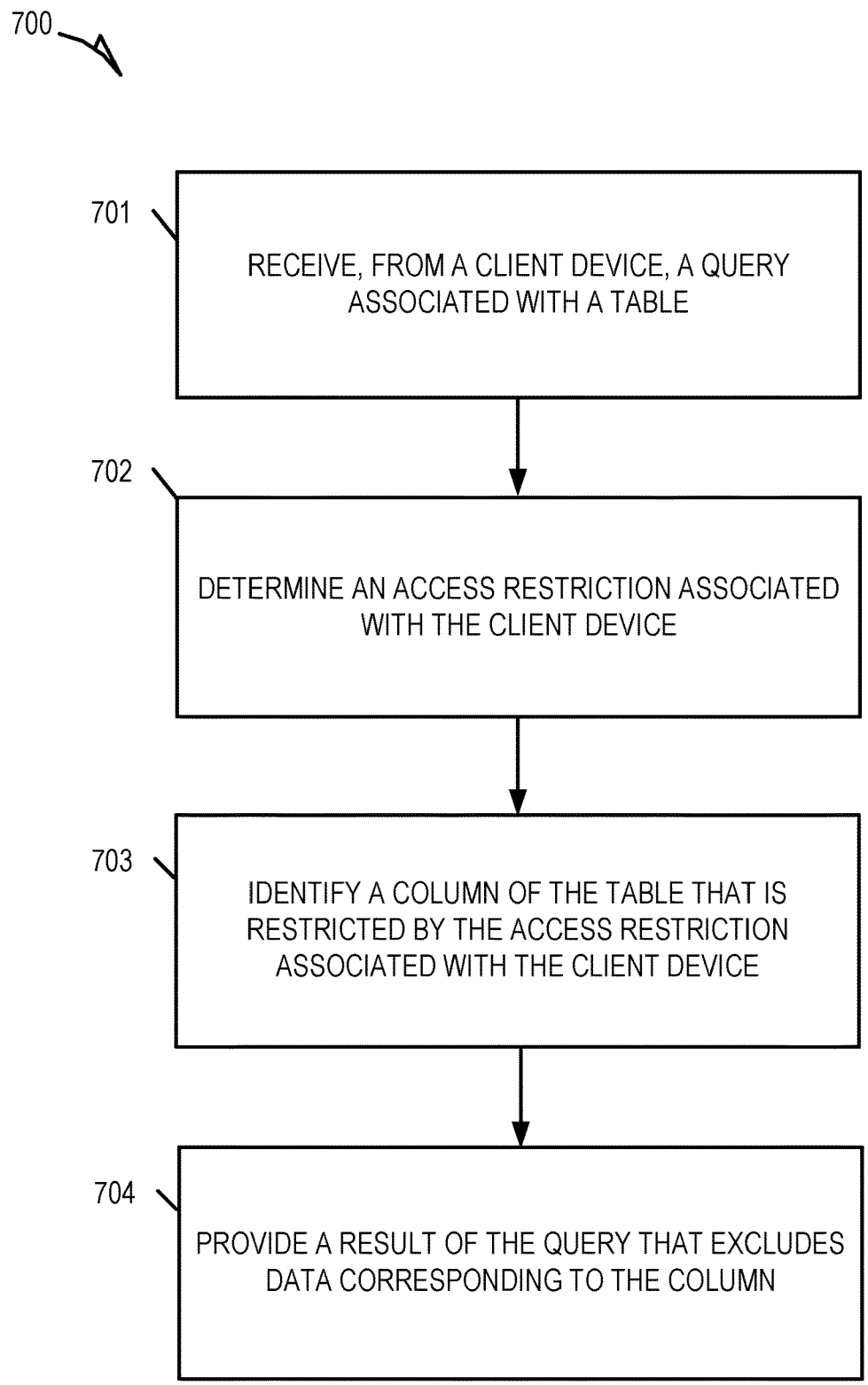
FIG. 7 is a flow diagram illustrating operations of the column hiding module, in accordance with some embodiments of the present disclosure.

FIG. 7 is a flow diagram illustrating operations 700 of the column hiding manager 400, in accordance with some embodiments of the present disclosure. The operations 700 may be embodied in computer-readable instructions for execution by one or more hardware components (e.g., one or more processors) such that the operations of the operations 700 may be performed by components of data platform 102 such as the execution platform 110. Accordingly, the operations 700 is described below, by way of example with reference thereto. However, it shall be appreciated that operations 700 may be deployed on various other hardware configurations and is not intended to be limited to deployment within the data platform 102. Depending on the embodiment, an operation of the operations 700 may be repeated in different ways or involve intervening operations not shown. Though the operations of the operations 700 may be depicted and described in a certain order, the order in which the operations are performed may vary among embodiments, including performing certain operations in parallel or performing sets of operations in separate processes.

At operation 701, the column hiding manager 400 receives, from a client device 114, a query associated with a table, as discussed above.

At operation 702, the column hiding manager 400 determines an access restriction associated with the client device 114, as discussed above.

At operation 703, the column hiding manager 400 identifies a column of the table that is restricted by the access restriction associated with the client device 114, as discussed above.

At operation 704, the column hiding manager 400, in response to identifying the column of the table that are restricted by the access restriction associated with the client device 114, provides a result of the query that excludes data corresponding to the column, as discussed above.

Described implementations of the subject matter can include one or more features, alone or in combination as illustrated below by way of example.

Example 1. A system comprising: at least one hardware processor; and at least one memory storing instructions that cause the at least one hardware processor to execute operations comprising: receiving, from a client device, a query associated with a table; determining an access restriction associated with the client device; identifying a column of the table that is restricted by the access restriction associated with the client device; and in response to identifying the column of the table that is restricted by the access restriction associated with the client device, providing a result of the query that excludes data corresponding to the column.

Example 2. The system of Example 1, wherein the data excluded from the result comprises a name of the column and information stored in the column.

Example 3. The system of any one of Examples 1-2, the operations comprising: generating a view of the table that excludes the column.

Example 4. The system of Example 3, wherein the query comprises a select operation associated with all columns of the table.

Example 5. The system of any one of Examples 1-4, wherein the query includes a request for information corresponding to the column, the operations comprising: providing an error as the result indicating that the requested query failed to execute.

Example 6. The system of any one of Examples 1-5, the operations comprising: forming a subset of data using a plurality of columns of the table in response to receiving the query; modifying the subset of the data by removing, from the subset of the data, the column that is restricted by the access restriction associated with the client device; and generating the result comprising the modified subset of the data.

Example 7. The system of any one of Examples 1-6, the operations comprising: identifying a virtual column that includes one or more references to the column that is restricted by the access restriction associated with the client device; determining that the query includes a request to access the virtual column; and preventing access to the virtual column for the client device by failing the query in response to determining that the query requests access to the virtual column that includes one or more references to the column that is restricted by the access restriction associated with the client device.

Example 8. The system of any one of Examples 1-7, wherein the query comprises a cloning operation, the operations comprising: preventing performance of the cloning operation of the query in response to identifying the column of the table that is restricted by the access restriction associated with the client device.

Example 9. The system of any one of Examples 1-8, wherein the query includes a request access to metadata associated with the table, the operations comprising: forming a subset of data representing metadata corresponding to a plurality of columns of the table in response to receiving the query; modifying the subset of the data by removing, from the subset of the data, metadata corresponding to the column that is restricted by the access restriction associated with the client device; and generating the result comprising the modified subset of the data.

Example 10. The system of any one of Examples 1-9, wherein the access restriction is based on one or more criteria comprising at least one of a role of a user of the client device, an IP address of the client device, a specified time, or a range of times.

Example 11. The system of Example 10, the operations comprising: identifying at least one of the role of the user of the client device, the IP address of the client device, or a current time; and determining that the access restriction is satisfied in response to determining that the identified role of the user of the client device, the IP address of the client device, or the current time corresponds to the one or more criteria of the access restriction.

Example 12. The system of Example 11, the operations comprising evaluating a policy expression to determine that the access restriction is satisfied.

Example 13. The system of any one of Examples 1-12, the operations comprising: receiving, from the client device, an insert operation for adding an entry to an individual column of the table; and in response to receiving the insert operation, generating a command comprising the entry and one or more values for the column of the table that is restricted by the access restriction associated with the client device.

Example 14. The system of Example 13, wherein the one or more values comprise at least one of a null value, a default value, or a value associated with a sequence of the column of the table that is restricted by the access restriction associated with the client device.

Example 15. The system of any one of Examples 13-14, the operations comprising: determining that the column is incapable of storing the one or more values; and in response to determining that the column is incapable of storing the one or more values, preventing execution of the insert operation and returning an error.

Example 16. The system of any one of Examples 1-15, the operations comprising: receiving, from the client device, an update or delete operation; determining that the column of the table that is restricted by the access restriction associated with the client device is specified in the update or delete operation; and in response to determining that the column of the table that is restricted by the access restriction associated with the client device is specified in the update or delete operation, preventing execution of the update or delete operation and returning an error.

Example 17. The system of any one of Examples 1-16, the operations comprising: generating an object comprising a policy expression that defines the access restriction; and associating a plurality of columns of the table with the object to restrict access to the plurality of columns using a same policy expression.

Example 18. The system of Example 17, the operations comprising: receiving input comprising an update to the access restriction associated with the object; and automatically applying the update to the access restriction to each of the plurality of columns in response to receiving the input.

Figure 8:
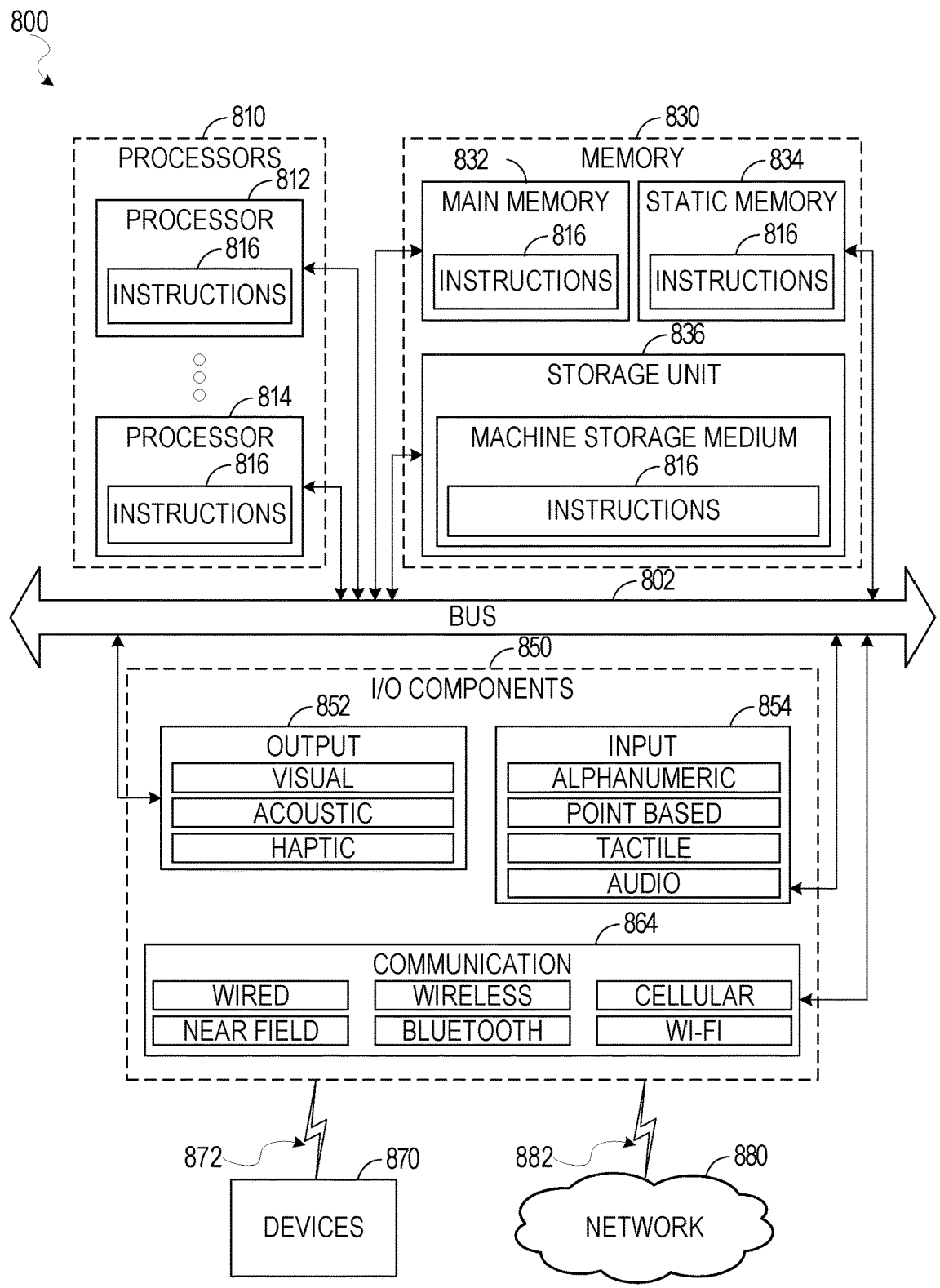
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the above processes (e.g., operations 700). In this way, the instructions 816 transform a general, non-programmed machine into a particular machine 800 (e.g., the compute service manager 108 or one or more execution nodes of the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include any other computing device described herein as being in communication with the data platform 102.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple transitory or non-transitory storage devices and/or media (e.g., a centralized or distributed database, and/or associated caches and servers) that store executable transitory or non-transitory instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the process or operations 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to execute operations comprising:
   receiving, from a client device, a query associated with a table;
   determining an access restriction associated with the client device;
   identifying a column of the table that is restricted by the access restriction associated with the client device;
   in response to identifying the column of the table that is restricted by the access restriction associated with the client device, providing a result of the query comprising data associated with one or more columns of the table and excluding data corresponding to the column that is restricted by the access restriction; and
   wherein the query comprises a cloning operation, the operations comprising: preventing performance of a cloning operation of the query in response to identifying the column of the table that is restricted by the access restriction associated with the client device.

2. The system of claim 1, wherein the data excluded from the result comprises a name of the column and information stored in the column.

3. The system of claim 1, the operations further comprising:
   generating a view of the table that excludes the column.

4. The system of claim 3, wherein the query comprises a select operation associated with all columns of the table.

5. The system of claim 1, wherein the query includes a request for information corresponding to the column, the operations further comprising:
   providing an error as the result indicating that the requested query failed to execute.

6. The system of claim 1, the operations further comprising:
   forming a subset of data using a plurality of columns of the table in response to receiving the query;
   modifying the subset of the data by removing, from the subset of the data, the column that is restricted by the access restriction associated with the client device; and
   generating the result comprising the modified subset of the data.

7. The system of claim 1, the operations further comprising:
   identifying a virtual column that includes one or more references to the column that is restricted by the access restriction associated with the client device;
   determining that the query includes a request to access the virtual column; and
   preventing access to the virtual column for the client device by failing the query in response to determining that the query requests access to the virtual column that includes one or more references to the column that is restricted by the access restriction associated with the client device.

8. The system of claim 1, wherein the query includes a request access to metadata associated with the table, the operations further comprising:
   forming a subset of data representing metadata corresponding to a plurality of columns of the table in response to receiving the query;
   modifying the subset of the data by removing, from the subset of the data, metadata corresponding to the column that is restricted by the access restriction associated with the client device; and
   generating the result comprising the modified subset of the data.

9. The system of claim 1, wherein the access restriction is based on one or more criteria comprising at least one of a role of a user of the client device, an IP address of the client device, a specified time, or a range of times.

10. The system of claim 9, the operations further comprising:
    identifying at least one of the role of the user of the client device, the IP address of the client device, or a current time; and
    determining that the access restriction is satisfied in response to determining that the identified role of the user of the client device, the IP address of the client device, or the current time corresponds to the one or more criteria of the access restriction.

11. The system of claim 10, the operations further comprising evaluating a policy expression to determine that the access restriction is satisfied.

12. The system of claim 1, the operations comprising:
    receiving, from the client device, an insert operation for adding an entry to an individual column of the table; and
    in response to receiving the insert operation, generating a command comprising the entry and one or more values for the column of the table that is restricted by the access restriction associated with the client device.

13. The system of claim 12, wherein the one or more values comprise at least one of a null value, a default value, or a value associated with a sequence of the column of the table that is restricted by the access restriction associated with the client device.

14. The system of claim 12, the operations comprising:
    determining that the column is incapable of storing the one or more values; and
    in response to determining that the column is incapable of storing the one or more values, preventing execution of the insert operation and returning an error.

15. The system of claim 1, the operations further comprising:
    receiving, from the client device, an update or delete operation;
    determining that the column of the table that is restricted by the access restriction associated with the client device is specified in the update or delete operation; and
    in response to determining that the column of the table that is restricted by the access restriction associated with the client device is specified in the update or delete operation, preventing execution of the update or delete operation and returning an error.

16. The system of claim 1, the operations further comprising:
    generating an object comprising a policy expression that defines the access restriction; and
    associating a plurality of columns of the table with the object to restrict access to the plurality of columns using a same policy expression.

17. The system of claim 16, the operations further comprising:
receiving input comprising an update to the access restriction associated with the object; and
automatically applying the update to the access restriction to each of the plurality of columns in response to receiving the input.

18. A method comprising:
receiving, from a client device, a query associated with a table;
determining, by at least one hardware processor, an access restriction associated with the client device;
identifying a column of the table that is restricted by the access restriction associated with the client device;
in response to identifying the column of the table that is restricted by the access restriction associated with the client device, providing a result of the query comprising data associated with one or more columns of the table and excluding data corresponding to the column that is restricted by the access restriction; and
wherein the query comprises a cloning operation, and preventing performance of a cloning operation of the query in response to identifying the column of the table that is restricted by the access restriction associated with the client device.

19. The method of claim 18, wherein the data excluded from the result comprises a name of the column and information stored in the column.

20. The method of claim 18, further comprising:
generating a view of the table that excludes the column.

21. The method of claim 20, wherein the query comprises a select operation associated with all columns of the table.

22. The method of claim 18, wherein the query includes a request for information corresponding to the column, further comprising:
providing an error as the result indicating that the requested query failed to execute.

23. The method of claim 18, further comprising:
forming a subset of data using a plurality of columns of the table in response to receiving the query;
modifying the subset of the data by removing, from the subset of the data, the column that is restricted by the access restriction associated with the client device; and
generating the result comprising the modified subset of the data.

24. The method of claim 18, further comprising:
identifying a virtual column that includes one or more references to the column that is restricted by the access restriction associated with the client device;
determining that the query includes a request to access the virtual column; and
preventing access to the virtual column for the client device by failing the query in response to determining that the query requests access to the virtual column that includes one or more references to the column that is restricted by the access restriction associated with the client device.

25. The method of claim 18, further comprising:
receiving, from the client device, an update or delete operation;
determining that the column of the table that is restricted by the access restriction associated with the client device is specified in the update or delete operation; and
in response to determining that the column of the table that is restricted by the access restriction associated with the client device is specified in the update or delete operation, preventing execution of the update or delete operation and returning an error.

26. A non-transitory computer-storage medium storing instructions that, when executed by a processor of a machine, configure the machine to perform operations comprising:
receiving, from a client device, a query associated with a table;
determining an access restriction associated with the client device;
identifying a column of the table that is restricted by the access restriction associated with the client device;
in response to identifying the column of the table that is restricted by the access restriction associated with the client device, providing a result of the query comprising data associated with one or more columns of the table and excluding data corresponding to the column that is restricted by the access restriction; and
wherein the query comprises a cloning operation, the operations comprising: preventing performance of a cloning operation of the query in response to identifying the column of the table that is restricted by the access restriction associated with the client device.

27. The non-transitory computer-storage medium of claim 26, wherein the data excluded from the result comprises a name of the column and information stored in the column.

28. The non-transitory computer-storage medium of claim 26, the operations comprising:
generating a view of the table that excludes the column.

29. The non-transitory computer-storage medium of claim 28, wherein the query comprises a select operation associated with all columns of the table.

30. The non-transitory computer-storage medium of claim 26, wherein the query includes a request for information corresponding to the column, the operations comprising:
providing an error as the result indicating that the requested query failed to execute.

* * * * *